Feb. 3, 1970     O. CIMBAL     3,492,812
WORK SCHEDULING AND TIME CONTROL DEVICE
Filed Sept. 13, 1967     3 Sheets-Sheet 1

INVENTOR.
OTTO CIMBAL
BY George B. White
ATTORNEY

Feb. 3, 1970   O. CIMBAL   3,492,812
WORK SCHEDULING AND TIME CONTROL DEVICE
Filed Sept. 13, 1967   3 Sheets-Sheet 2

INVENTOR.
OTTO CIMBAL
BY George B White
ATTORNEY

Feb. 3, 1970  O. CIMBAL  3,492,812
WORK SCHEDULING AND TIME CONTROL DEVICE
Filed Sept. 13, 1967  3 Sheets-Sheet 3
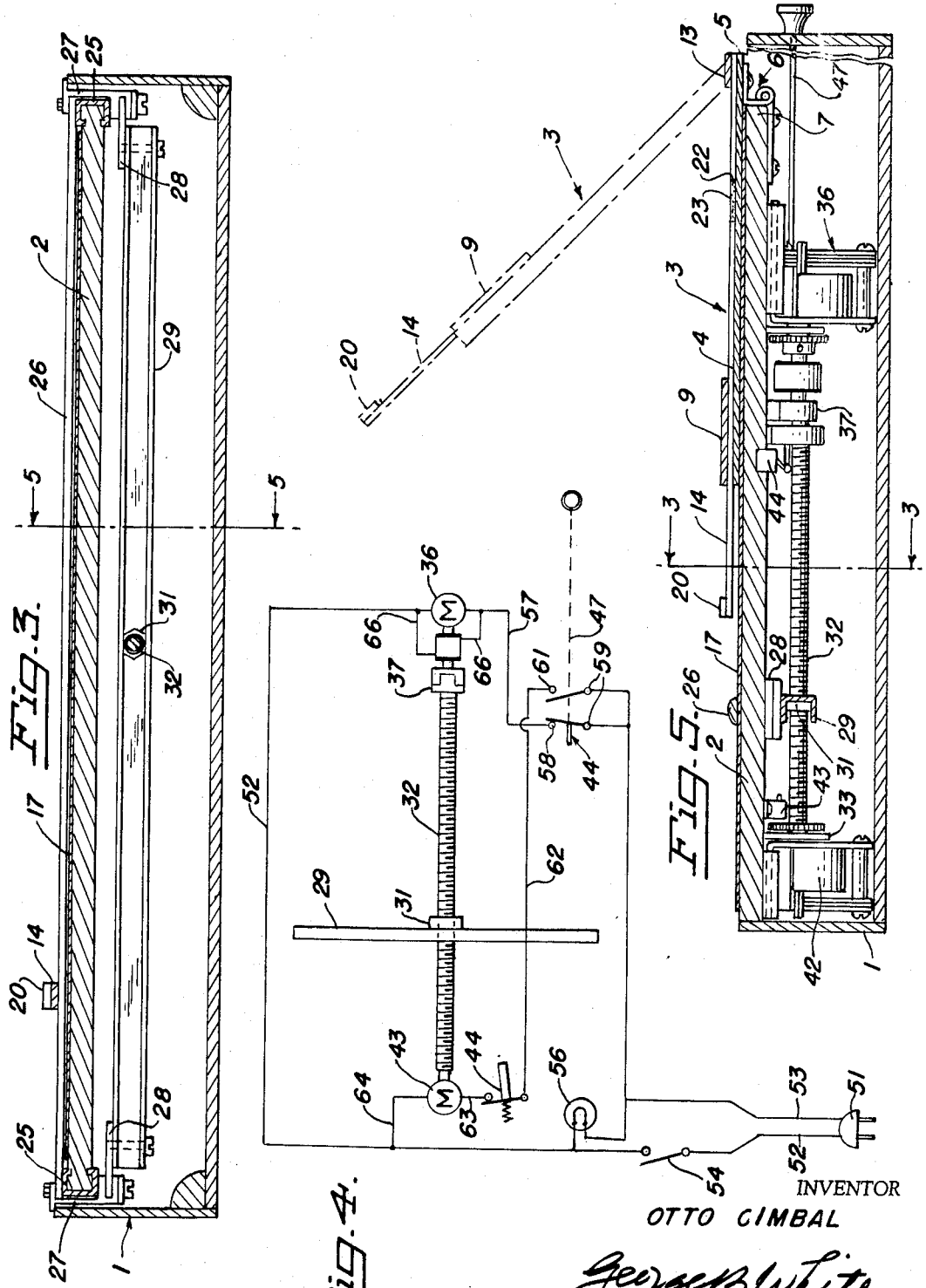
INVENTOR
OTTO CIMBAL
BY George B. White
ATTORNEY

United States Patent Office 3,492,812
Patented Feb. 3, 1970

3,492,812
WORK SCHEDULING AND TIME CONTROL DEVICE
Otto Cimbal, 2166 41st Ave.,
San Francisco, Calif. 94116
Filed Sept. 13, 1967, Ser. No. 667,508
Int. Cl. G04b 47/06
U.S. Cl. 58—149                                    14 Claims

ABSTRACT OF THE DISCLOSURE

A boxboard has a frame pivotally secured to one edge of the board and a cross member of the frame for holding slideable indicators. The cross member is at about the middle of the board. A record sheet on the board extends beyond the cross member. A timer ruler extends across the board parallel with the cross member and at right angles to the indicators. A clock mechanism moves the timer ruler along the sheet so as to indicate the passage of time. The sheet has on it the time indication along the perpendicular edges and it has several columns under the slideable indicator. Each of them is headed by a worker's identification number or the like. There is a slideable indicator for each worker column. Horizontal time lines on the sheet are for indication of scheduled and elapsed time. The slide indicators are set in the column of each worker according to the scheduled time required for completing the particular job assigned to the worker. There is a time indicator field on the half of the board below the cross member and the alignment of the trailing end of each slideable indicator gives a ready reading of the time remaining for the particular worker. Automatic switch device reverses the movement of the time ruler after each time cycle to its initial position and shuts off the time drive until the next day or next cycle.

Brief description of the invention

The work scheduling and time control device has a cross member across a board. A plurality of time indicators are slideably held in the cross member. The upper half of the board has on it a replaceable scheduling sheet with vertical indications parallel with the indicators for the scheduled and elapsed time, and a plurality of vertical columns with identifying headings for the respective workers. Each sliding indicator is aligned with a column and is movable so that the top edge of each indicator can be set to the schedule for the completion of a job assigned to the respective worker. The lower or trailing edge of each slide co-operates with another scale which indicates the hours remaining available by each worker; an electrically driven clock mechanism is connected to a time ruler which latter is moved from an initial position across the board toward the cross member to indicate elapsed time relatively to the setting of the leading or top edges of the indicator; a switch is automatically actuated when the time ruler reaches its position at the end of the scheduled day, and another electrical device is actuated to return the time ruler to its initial position at which the electric circuit is rendered inoperative until the beginning of the next cycle of operation.

Description of figures

FIG. 3 is a cross-sectional view, the section being taken on lines 3—3 of FIG. 5.
FIG. 4 is a wiring diagram.
FIG. 5 is a sectional view, the section being taken on lines 5—5 of FIG. 3.

Detailed description

Figure 1:
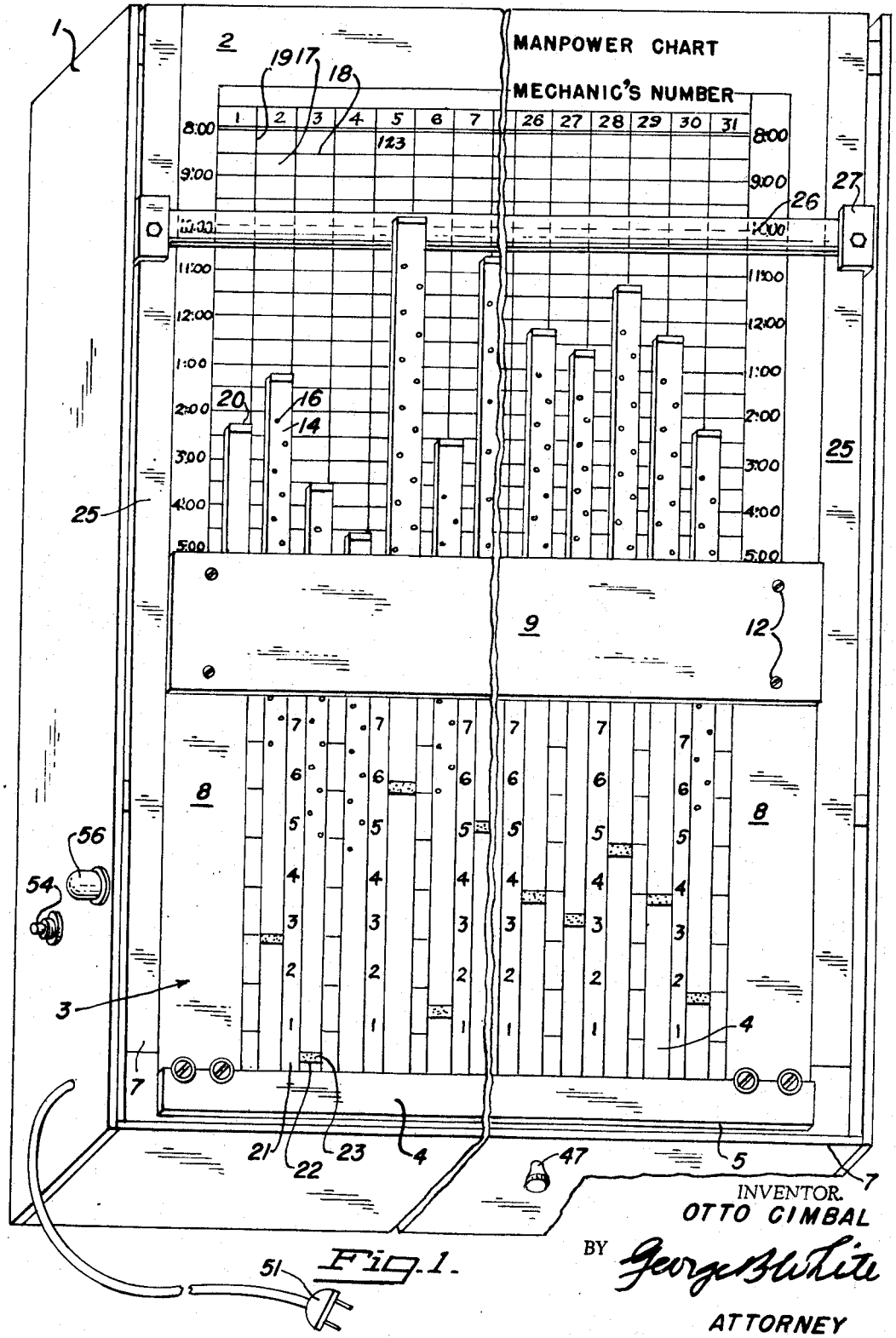
FIG. 1 is a fragmentary perspective view.

In the illustrative embodiment of the invention herein, a suitable box 1 has a top board 2. A skeleton frame 3 has a base plate 4 an end 5 of which is secured by hinges 6 to one end 7 of the board 2. Sides 8 of the frame 3 are spaced from one another to leave an open field or space there-between. An indicator holder 9 connects the upper ends of the sides 8 of the frame 3. The indicator holder 9 is spaced above the base plate 4 by the sides 8 and is secured in place in any suitable manner, such as by screws 12. The hinged end 5 is also provided with a spaced cover plate 13. In the spaces between the holder 9 and the base plate 4 is held frictionally a plurality of spaced slide indicators 14. Each indicator 14 is provided with a plurality of alternately offset holes 16 to be engaged by the point of a pencil or a like instrument for sliding the indicator 14 to a selected position on the board.

On the upper half of the board between the slide holder 9 and the face of the board 2 is a planning sheet 17 which is suitably marked to co-operate with the respective slide indicators 14 for scheduling and indicating, for instance, the job assigned to certain workers in a shop.

In the present illustration the planning sheet 17 has a plurality of columns with horizontal time lines 18 spaced apart to indicate the time, for instance, aligned for each half hour. A column of numerals along each edge of the sheet indicates the hours at the respective ends of the horizontal time lines 18. Perpendicular lines 19 separate the sheet into columns. At the head of each column is suitable identification for the respective worker, in this illustration the worker's number. There is a slide indicator 14 overlying each column. The perforations or holes 16 on each slide indicator 14 are spaced apart at a distance corresponding to the spacing between the time lines 18 for each half an hour. At the leading or top edge of each slide indicator 14 is a lug 20 to facilitate the moving of the top edge of the slide indicator away from the initial position adjacent the slide holder 9. The slide indicators 14 are spaced from one another and between each pair of adjacent slide indicators 14 is provided a guide 21 on which are time indications, arranged so as to indicate the available time as shown by the position of the trailing lower edge 22 of each slide indicator 14. The lower end of the slide indicator 14 is formed with suitable magnet, in this form a suitable magnetic tape 23 thereon. The base plate 4 in the frame 3 is of suitable metal to coact with the magnetic tape 23 for holding the indicator 14 in adjusted position.

The elapsed time as compared with the scheduled time is indicated by a time ruler 26 which extends transversely across the board 2 and is secured to suitable travelers 27 which travel along and over guide rails 25 on the opposite edges of the board 2. The time ruler 26 is convex at its top surface so as to fit under the respective ends of the slide indicators 14 which latter are slideably spaced above the sheet 17 by the base plate 4. Each traveler 27 has a horizontal extension 28 under the board 2 inside of the box 1 and to these extensions 28 is secured a traveling crossbar 29. The center of the crossbar 29 is provided with a traveling nut 31. A timing screw shaft 32 is suitably journalled in bearing brackets 33 extending from the under side of the board 2. The screw shaft 32 is turned by a suitable clock mechanism such as the electric clock motor 36 mounted in the box 1. The clock mechanism is connected to the screw shaft 32 by a clutch. In this illustration an electro-magnetically operated one-way clutch 37 is provided. Whenever the clock motor 36 is in operation and the clutch 37 is energized, it rotates the screw shaft 32 at a properly geared speed so as to advance the traveling nut 31 at a suitable speed to transmit motion through the bar 29 to the travelers 27 thereby to move the time ruler 26 along the sheet 17 at a rate of speed corresponding to the time indications on the sheet 17. The time ruler 26 may be returned to its initial position when the clutch 37 is disengaged, either manually or by an electric motor. Four spaced pulleys or sprockets 41 are provided substantially in the four corners of the area traveled by the time ruler 26. A chain 42 is played around the four pulleys 41 so that the branches of the chain intersect diagonally of said area. The ends of the chain 42 are connected to the respective traveler plates 28 so that when the crossbar 29 is moved, the opposite ends thereof are moved in synchronism by the chain 42 which pulls the travelers 27 simultaneously in the respective directions. For automatically moving the travelers 27 into initial position a suitable electric motor 42 is mounted in the box 1 and is connetced to the shaft 32 so as to rotate the shaft 32 in reverse direction when the clutch 37 is disconnected, and thereby to shift the traveler crossbar 29 toward the top edge of the board 2.

In this illustration, for the actuation of the respective motors, a three-way toggle switch 44 is provided. This switch 44 alternately actuates the clock motor 36 and the reversing motor 42. The toggle switch 44 is in the path of the traveling bar 29 so that when the traveling bar 29 reaches the bottom of the sheet 17 it pushes the button of the toggle switch 44 into its reverse position thereby disconnecting the clock motor 36 and deenergizing the clutch 37 and simultaneously energizing the reverse motor 43. Thus the screw shaft 32 is rotated in reverse direction and the crossbar 29 is returned to its initial position. When the traveler bar 29 reaches its initial position it actuates a micro switch 46 which is resiliently urged normally into a circuit closing position. The traveling crossbar 29 abuts the micro switch 46 so as to break the electric circuit and thereby stop the operation of the reverse motor 42. A handle rod 47 extends from the toggle switch 44 to the outside through the front wall of the box 1 so that by pushing the rod 47 inwardly the toggle switch 44 is returned to the initial position for again closing the electric circuit of the clock motor 36 and energizing the clutch 37 for resuming the operation of the device. The slide indicators 14 may be made in different colors to indicate the various specialists, thereby facilitating the quick visual determination of the availability of certain specialists.

The electrical operation of the timing parts of the device is illustrated in the wiring diagram in FIG. 4. A plug 51 is adapted to connect the circuit to the usual wiring in a building. The plug 51 has lines 52 and 53 leading into the circuit of the device. A suitable main switch 54 is interconnected in line 52 for opening and closing the entire electric circuit. A signal lamp 56 is connected parallel with the motors 43 and 36 to indicate that the electricity is "on." The line 52 is connected to a terminal of the timing motor 36. The other terminal of the timing motor 36 is connected by a line 57 to a terminal 58 of the toggle switch 44. The line 53 is connected to the base terminal 59 of the toggle switch 44. The alternate or third terminal 61 of the toggle switch 44 is connected by a line 62 to a terminal of the micro-switch 46, the other terminal of which latter is connected by a line 63 to a terminal of the reversing motor 43. The other terminal of the reversing motor 43 is connected by a line 64 to main line 52. The electro-magnetic clutch 37 is connected in parallel with the timing motor 36 by lines 66.

In operation, as the controller assigns a job to a mechanic whose number is, for instance, "5," then he writes the job identifying indicia for instance "123" in the column headed by "5" as shown in FIG. 1. The estimated time for job "123" is two hours, hence the controller inserts a pencil or the like in one of the holes 16 and pushes the indicator 14 overlying column "5" to the time line spaced two hours from the initial position, namely to "10:00," as shown in FIG. 1. The main switch 54 is turned "on."

Figure 2:
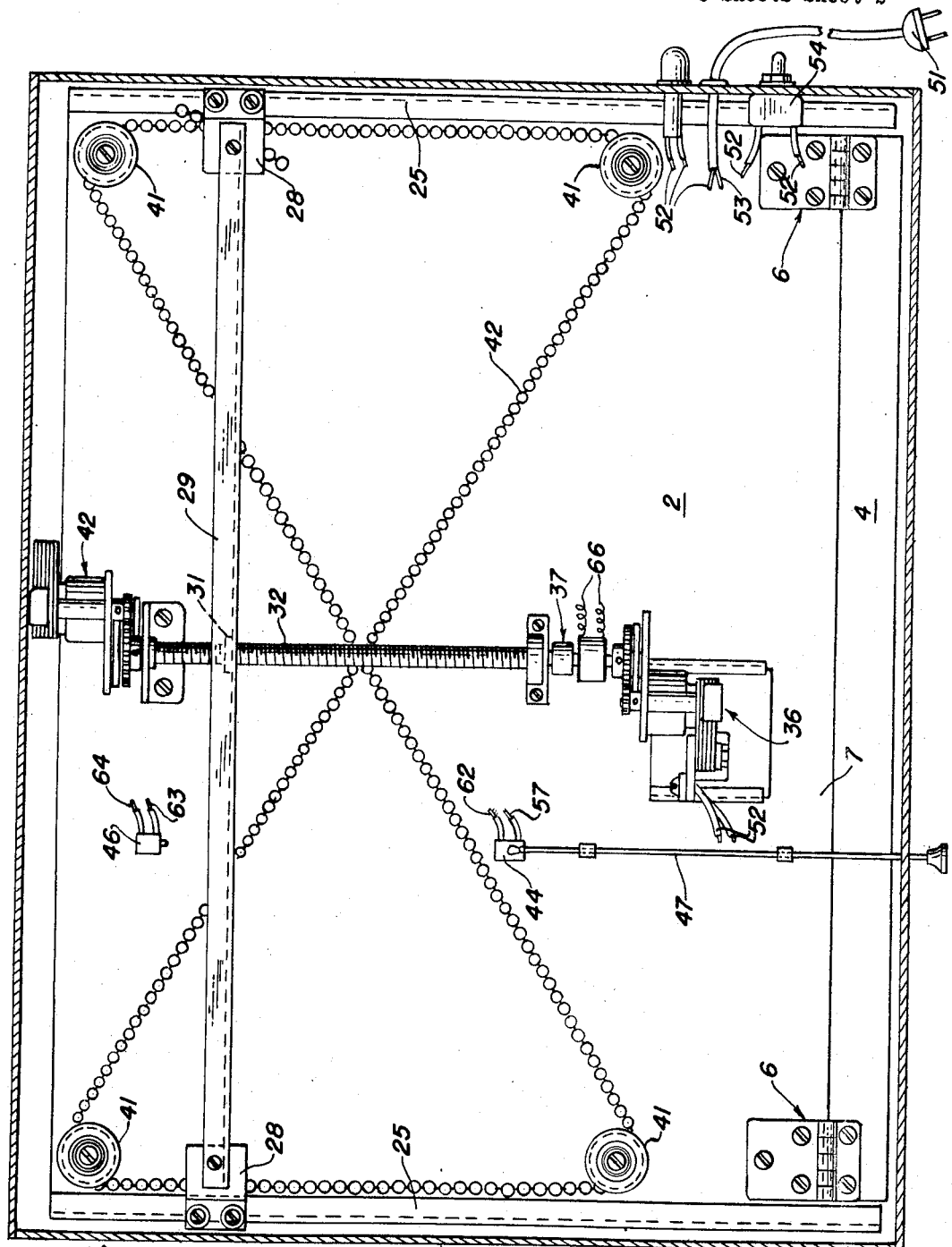
FIG. 2 is a bottom plan view of the device.

The rod 47 is pushed inward viewing FIG. 2 so as to return the toggle switch 44 into position for closing the timing circuit. Thus the clutch device 37 is energized and the motor of the timing device 36 is operated. The light 56 is also "on" and indicates that the timing circuit is in operation. The turning of the screw shaft 32 moves the traveling crossbar 29 away from its initial "8:00" position at the top of the board 2 toward the indicator holder 9 at the rate corresponding to the spacing between the time lines 18. After two hours time has elapsed the time ruler 26 reaches the position shown in FIG. 1, riding under the leading end of the indicator 14. If job "123" has been completed at about this time, the controller assigns another job to worker "5" and shifts the indicator according to the estimated time for the next job. The position of the trailing end 22 relatively to spaced indicia alongside indicates the available remaining time, for instance in FIG. 1 about six hours for worker "5." Thus by marking the respective jobs throughout the day on the sheet 17, a good record of the work done by the worker is also obtained. It is one of the important advantages of this device that the position of the time ruler 26 with relation to the indicator 14 gives accurate indication of the difference between the estimated time for a job and the actual time it took for the worker to complete the job; for instance, when the time ruler 26 reaches the leading indicator 14 set for the estimated time for the job, and if the job is not yet finished, then the time ruler 26 rides under the indicator 14 and the distance between the excess position of the time ruler 26 and the setting of the leading edge of the indicator 14 gives an accurate reading of how much the estimated time for the job has been exceeded by the worker. This accurate indication of such excess time on a particular job permits the controller to make a correction of the estimated time for such job or as to the capacity of the particular worker. At the end of the working day the traveling crossbar 29 snaps the toggle switch 44 forward viewing FIG. 2, breaks the timing and clutch circuit and closes the circuit of the reversing motor 43 through the normally resiliently closed micro-switch 46, thereby to rotate the screw shaft 32 in reverse and return the traveling crossbar 29 and the time ruler 26 to the initial or starting position, in which position the crossbar 29 is engaged with the micro-switch 46 open and both motors inoperative, but ready for next day or for the next cycle of operation.

While in this illustration reference is made to "vertical" columns and horizontal time lines, it is to be understood that these terms are relative but the board may be arranged so that the time ruler 26 moves horizontally. Also devices different from those shown may be utilized for advancing and reversing the movement of the time ruler 26, and sheets ruled to suit particular productions or operations may be provided.

I claim:
1. In a planning and time control device:
 (a) a planning sheet adapted to be written on and being divided by markings into parallel columns and series of time lines intersecting the columns,
 (b) an elongated indicator overlying and being parallel with each column thereby to coact with said intersecting time lines for indicating selected time to which the respective indicators are set,
 (c) a guide support extended transversely to said columns and to said indicators for adjustably supporting the indicators in selected positions relatively to said times lines for indicating elapsed time and available time,
 (d) a time ruler parallel with the time lines and with said guide support and movable over and along said columns for coacting with said time lines and said indicators for indication of elapsed time,

(e) and timed drive mechanism for moving said time ruller at a rate corresponding to the spacing between the time lines, thereby to afford reading of elapsed time by the relative position of said time ruler.

2. The invention defined in claim 1, and
(f) a board for supporting said indicator support and said time drive mechanism, said planning sheet being replaceable on said board and being beneath said indicators.

3. The invention defined in claim 1 and
(f) each of said time indicators having a plurality of spaced elements engageable for moving the indicator longitudinally along the adjacent column, the engageable elements being spaced apart in sequence to the same distance as the spacing between the time lines whereby said elements being located in registry with the respective time lines.

4. The invention defined in claim 3 and
(f) said indicator support including a transverse member parallel with said time ruler, said indicators projecting beyond both sides of said transverse support member,
(g) a time scale along the indicators on the side of the said support member farthest from said time ruler coacting with the adjacent end of each indicator for indicating available time relatively to the planned time indicated by the end of the indicator adjacent the time ruler.

5. The invention defined in claim 3 and
(f) said indicator support including a frame pivoted on the board thereby to lift all the indicators off the board for the insertion and replacement of said planning sheet.

6. The invention defined in claim 3 and
(f) said support having an exposed space corresponding to said indicators, thereby to permit observation of the adjacent ends of the indicators relatively to a time scale within said exposed space.

7. The invention defined in claim 2 and
(f) frictional means to hold said indicators in selected position.

8. The invention defined in claim 2 and
(f) coacting magnetic means on the ends of the indicators and on said board to hold the indicators in selected positions.

9. The invention defined in claim 1 and
(e) said timed drive mechanism including a time clock on the underside of the board opposite from said planning sheet,
(f) guides on the opposite ends of said time ruler guided along the opposite parallel edges of said board,
(g) a traveler crossbar between said guides beneath the board, and
(h) a drive connection between said clock mechanism and said traveler member for moving the traveling member, the guides and the time ruler.

10. The invention defined in claim 1 and
(e) said timed drive mechanism being electrically operated,
(f) a switch for controlling the circuit of said timed drive mechanism,
(g) actuating means on said switch coacting with said timed drive mechanism for turning off said switch when said time ruler reaches the last time line on said planning sheet.

11. The invention defined in claim 10 and
(h) a reversing mechanism for returning the time ruler to its initial position.

12. The invention defined in claim 10 and
(h) an electrically operated reversing mechanism for returning said time ruler electric control means to actuate said reversing mechanism whenever said clock mechanism is rendered inactive, and to render said reversing mechanism inactive whenever the time ruler reaches its initial starting position.

13. The invention defined in claim 1
(e) means to support said time ruler in said parallel attitude, said time ruler being adapted to ride past the adjacent ends of said indicators thereby indicating elapsed time in excess of the time to which the respective indicators were set.

14. The invention defined in claim 1 and
(e) each indicator having a leading end registerable with a selected time line to indicate said selected time,
(f) said time ruler being movable relatively over the respective indicator past said leading end thereby to indicate elapsed time in excess of the selected time.

References Cited
UNITED STATES PATENTS

| | | | |
|---|---|---|---|
| 1,004,097 | 9/1911 | South | 58—151 |
| 1,340,216 | 5/1920 | Diepenbrock | 58—151 |
| 2,419,394 | 4/1947 | Erhard | 58—151 |
| 2,596,551 | 5/1952 | Harris | 58—151 |

RICHARD B. WILKINSON, Primary Examiner

EDITH C. SIMMONS, Assistant Examiner

U.S. Cl. X.R.

58—151